United States Patent
Katahira (10) Patent No.: US 9,542,608 B2
(45) Date of Patent: Jan. 10, 2017

(54) IMAGE PROCESSING APPARATUS (75) Inventor: Satoshi Katahira, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 67 days.

(21) Appl. No.: 13/613,628

(22) Filed: Sep. 13, 2012

(65) Prior Publication Data

US 2013/0077825 A1    Mar. 28, 2013

(30) Foreign Application Priority Data

Sep. 27, 2011   (JP) ................. 2011-210222

(51) Int. Cl.
H04N 9/04    (2006.01)
G06K 9/00    (2006.01)

(52) U.S. Cl.
CPC .......... G06K 9/00805 (2013.01); H04N 9/04 (2013.01)

(58) Field of Classification Search
None
See application file for complete search history.

(56) References Cited

U.S. PATENT DOCUMENTS

| 6,373,518 B1 | 4/2002 | Sogawa | |
|---|---|---|---|
| 7,248,288 B2 * | 7/2007 | Ikeda et al. | 348/222.1 |
| 2002/0001409 A1 * | 1/2002 | Chen et al. | 382/167 |
| 2003/0085991 A1 * | 5/2003 | Toda | 348/42 |
| 2006/0114340 A1 * | 6/2006 | Sakurai et al. | 348/239 |
| 2007/0223819 A1 * | 9/2007 | Yamamoto | 382/218 |
| 2008/0211956 A1 * | 9/2008 | Imada et al. | 348/340 |
| 2009/0190800 A1 * | 7/2009 | Takahashi | 382/104 |
| 2009/0237491 A1 * | 9/2009 | Saito | 348/47 |
| 2010/0246896 A1 * | 9/2010 | Saito | 382/106 |

FOREIGN PATENT DOCUMENTS

| JP | 5-210737 A | 8/1993 |
|---|---|---|
| JP | 11-325889 A | 11/1999 |
| JP | 3349060 B2 | 11/2002 |

* cited by examiner

Primary Examiner — Sumati Lefkowitz
Assistant Examiner — Carol Wang
(74) Attorney, Agent, or Firm — McDermott Will & Emery LLP (57) ABSTRACT

There is provided an image processing apparatus. The image processing apparatus includes: a color reproducing unit for reproducing a luminance of a color phase, which is not set to each pixel of a pair of image data composed of Bayer array, based upon the adjacent pixels; and a matching processing unit for extracting blocks with a predetermined size from the pair of image data whose luminance is reproduced, and executing a matching process so as to specify blocks having high correlation. The color reproducing unit and the matching processing unit respectively execute the luminance reproduction and the matching process with only a color phase with the highest degree of occupation in the Bayer array.

8 Claims, 9 Drawing Sheets

|   | 1 | 2 | 3 | 4 |
|---|---|---|---|---|
| 1 |   |   |   |   |
| 2 | a |   | b |   |
| 3 |   |   |   |   |
| 4 | c |   | d |   |

|   | 1 | 2 | 3 | 4 |
|---|---|---|---|---|
| 1 |   | a |   | b |
| 2 |   |   |   |   |
| 3 |   | c |   | d |
| 4 |   |   |   |   |

|   | 1 | 2 | 3 | 4 |
|---|---|---|---|---|
| 1 |   |   |   |   |
| 2 |   | e |   |   |
| 3 | f |   | g |   |
| 4 |   | h |   |   |

CENTROID OF COLOR

FIG. 6C

CENTROID OF COLOR

FIG. 6D

CENTROID OF COLOR

HID LAMP

FIG. 8B

HALOGEN LAMP

FIG. 9

IMAGE PROCESSING APPARATUS

CROSS-REFERENCE TO RELATED APPLICATIONS

The present application claims priority from Japanese Patent Application. No. 2011-210222 filed on Sep. 27, 2011, the entire contents of which are hereby incorporated by reference.

BACKGROUND OF THE INVENTION

Field of the Invention

The present invention relates to an image processing apparatus that executes pattern matching based upon a pair of captured image data.

Description of Related Art

There has been known a technique of detecting an object that is an obstacle, such as a vehicle ahead or a traffic light, and making a control for avoiding a collision with the detected object and for keeping a safe distance between a vehicle and the vehicle ahead (for example, Japanese Patent No. 3349060 (Japanese Unexamined Patent Application Publication (JP-A) No. 10-283461)).

The distance between the vehicle and the vehicle ahead can be acquired from parallax of an object in a pair of image data that is captured at a different position. The parallax of the object in the pair of image data is derived based upon pattern matching between images. A general pattern matching is such that blocks with a predetermined size are compared (matched) between the images, and the blocks with the high correlation are specified. There is also a technique of executing the pattern matching by using a density histogram of the image (for example, JP-A No. 5-210737).

There is also a technique of geometrically correcting an optical positional deviation of the captured image before the pattern matching in order to enhance precision of the pattern matching (for example, Japanese Patent No. 3284190).

As a process of acquiring an image, her has been known a so-called Bayer array in which color filters of RGB signals, which are three primary colors, are regularly and exclusively arranged to plural light-receiving sections (photodiodes) corresponding to pixels that are arranged in a matrix, for example. In the Bayer array, at least one color phase of RGB is only acquired for each pixel. In general, a luminance value of unset (missing) color phase is interpolated based upon the adjacent pixels so as to reproduce color in each pixel. The position of each pixel whose color is reproduced is geometrically corrected as described above, and then, the pattern matching is executed.

However, the above-mentioned color reproduction is on the assumption that the original color of the target pixel, and the original color of the adjacent pixels are equal to each other. Therefore, when the colors of the adjacent pixels are different, or the object is different in the first place, the color is reproduced based upon the different color, which might cause false color. When the physical centroid of a pixel and the centroid of the color reproduced based upon this pixel are different from each other, the centroid of the color might be shifted due to the geometrical positional correction based upon the physical centroid of the pixel.

When a vehicle runs at night, an image is captured with an aperture being reduced (with the shutter being opened) in order to effectively acquire poor incident light. However, light of a light source in a detection region is too strong, so that a luminance value of an arbitrary color phase might be saturated.

SUMMARY OF THE INVENTION

The present invention is accomplished in view of the circumstance described above, and aims to provide an image processing apparatus that can properly execute pattern matching by specifying a color phase that is utilized for the pattern matching.

A first aspect of the present invention provides a image processing apparatus including: a color reproducing unit for reproducing luminance value of a color phase, which is not set to each pixel of a pair of image data composed of Bayer array, based upon the adjacent pixels; and a matching processing unit for extracting blocks with a predetermined size from the pair of image data whose luminance value is reproduced, and executing a matching process so as to specify blocks having high correlation. The color reproducing unit and the matching processing unit respectively execute the luminance reproduction and the matching process with only a color phase with the highest degree of occupation in the Bayer array being used as a target.

The image processing apparatus may further include a coordinate conversion, unit for performing a coordinate conversion of each pixel as upon a positional deviation characteristic of each pixel determined beforehand according to an imaging device that generates the pair of image data.

Another aspect of the present invention provides an image processing apparatus including: a matching processing unit for extracting blocks with a predetermined size from a pair of image data, and executing a matching process so as to specify blocks with high correlation; and an environment information acquiring unit for acquiring environment formation involved with contrast. The matching processing unit executes the matching process only for a color phase having the shortest wavelength from target plural color phases, when the environment information acquiring unit acquires environment information indicating that an environment has lightness not more than a predetermined lightness.

The matching processing unit may define an object, using either one of an HID lamp or a halogen lamp as a light source, as a target of the matching process.

The present invention can properly execute pattern matching by specifying a color phase that is utilized for the pattern matching. Accordingly, the image processing apparatus can properly derive the parallax information, thereby being capable of properly executing a control to avoid a collision to an object, or a control to keep a safe distance between a vehicle and a vehicle ahead.

DETAILED DESCRIPTION OF THE PREFERRED EMBODIMENTS

Preferable embodiments of the present invention will be described in detail below with reference to the attached drawings. The size, material, and other specific numerical values described in the embodiments are presented by way of example only for easy understanding of the invention, and are not intended to limit the scope of the inventions, unless otherwise specified. In the specification and drawings, components having substantially the same function and same configuration are identified by the same numerals, and the redundant description will not be repeated. The components not directly involved with the present invention are not illustrated.

(Environment Recognition System 100 According to First Embodiment)

The image processing apparatus aims to process an image that is captured for properly achieving an arbitrary object. When the image processing apparatus is employed for an environment recognition system that recognizes an environment around a vehicle, for example, the image processing apparatus processes an image captured by an imaging device, and derives parallax information of the image in order to specify a relative distance of an object in the image. For easy understanding of the image processing apparatus, an environment recognition system employing the image processing apparatus according to one embodiment will firstly be described, and then, a specific configuration of the image processing apparatus will be described.

Figure 1:
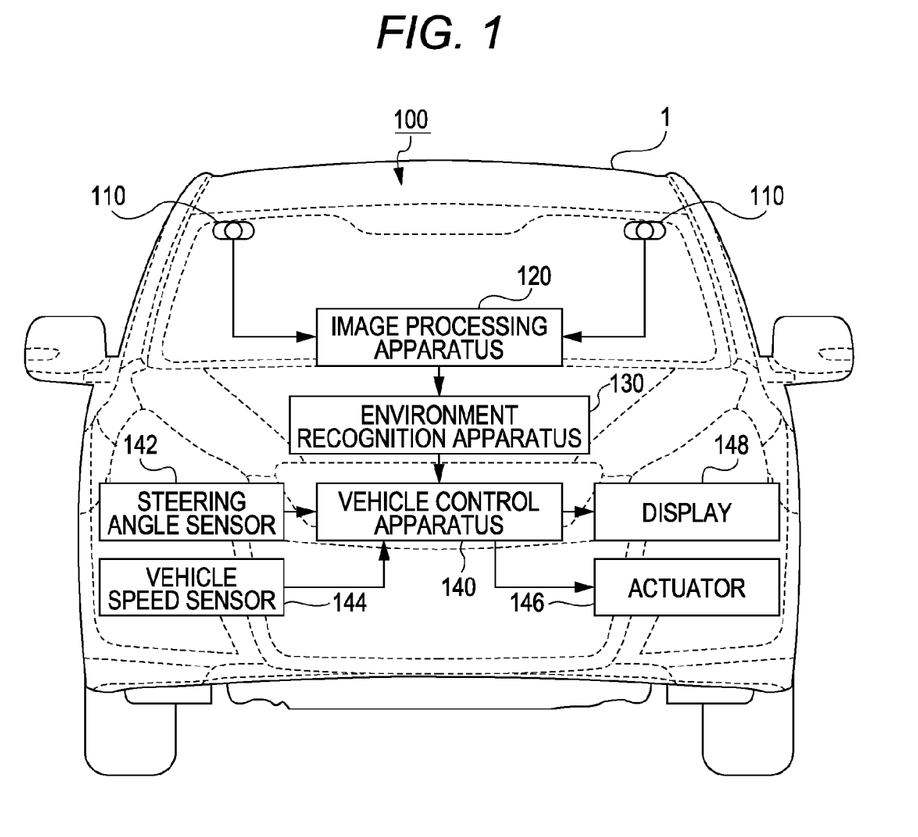
FIG. 1 is a block diagram illustrating a connection relationship in an environment, recognition system according to a first embodiment.

FIG. 1 is a block diagram illustrating a connection relationship in an environment recognition system 100. The environment recognition system 100 includes imaging devices 110 mounted in a vehicle 1, an image processing apparatus 120, an environment recognition apparatus 130, and a vehicle control apparatus 140.

(Imaging Device 110)

The imaging device 110 includes an image sensor such as a COD (Charge-Coupled. Device) or CMOS (Complementary Metal-Oxide Semiconductor), and it can acquire a color image, i.e., acquire a luminance of three color phases (red, green, blue) on a pixel basis. In the present embodiment, color and luminance are treated as being equivalent. When a sentence includes both words, they can be read such as a luminance forming a color, or a color having a luminance. It is supposed here that a color image according to Bayer array is acquired, wherein color filters for RGB signals are regularly and exclusively arranged to light-receiving sections (photodiodes) corresponding the respective pixels in the Bayer array. A color image captured by the imaging device 110 is referred to as a luminance image in order to distinguish the color image from a later-described distance image.

The imaging devices 110 are arranged to be apart from each other in a horizontal direction in order that optical axes of two imaging devices 110 are almost parallel to each other in a traveling direction of the vehicle 1. Each of the imaging devices 110 continuously generates image data, obtained by capturing an object present in a detection region ahead of the vehicle 1, per 1/60 second (60 fps), for example. The object includes not only a 3D object that is present independently, such as a vehicle, a traffic light, a road, or a guard rail, but also an object that can be specified as a part of a 3D object, such as a tail lamp, a turn signal, or a lighting part of a traffic light. Respective function units described below in the embodiment execute respective processes when the image data described above is updated.

(Image Processing Apparatus 120)

The image processing apparatus 120 obtains image data from each of two imaging devices 110, evaluates correlation between a pair of obtained image data, and derives parallax information including parallax between arbitrary blocks (blocks formed by collecting predetermined number of pixels) in both images. The image processing apparatus 120 derives the parallax by using a so-called pattern matching. Specifically, in the pattern matching, a block corresponding to a block (for example, a matrix of (4 pixels in a horizontal direction)×(4 pixels in a vertical direction)) arbitrarily extracted from one image data is searched from the other image data. Here, the horizontal direction means a lateral direction of the captured image in the screen, and corresponds to the wide direction in the real world. The vertical direction means a longitudinal direction, of the captured image in the screen, and corresponds to the height direction in the real world. The evaluation of the correlation and the pattern matching described above will be described in detail later.

The image processing apparatus 120 can derive the parallax for each block that is a unit of detection resolution, but it cannot recognize the object to which this block belongs. Therefore, the parallax information is derived not on an object basis, but is derived independently on a detection-resolution basis (for example, on a block basis) in the detection region. The image formed by associating the parallax information derived as described above with the image data is referred to as a distance image.

Figure 2A:
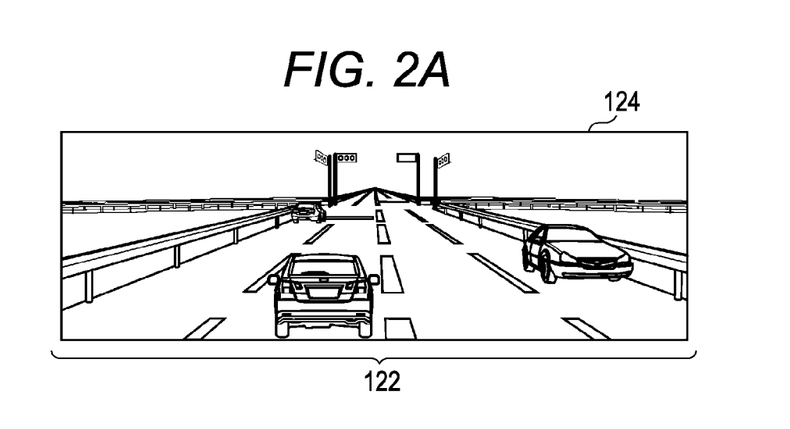
FIG. 2 is an explanatory view for describing a brightness image and a range image.
Figure 2B:
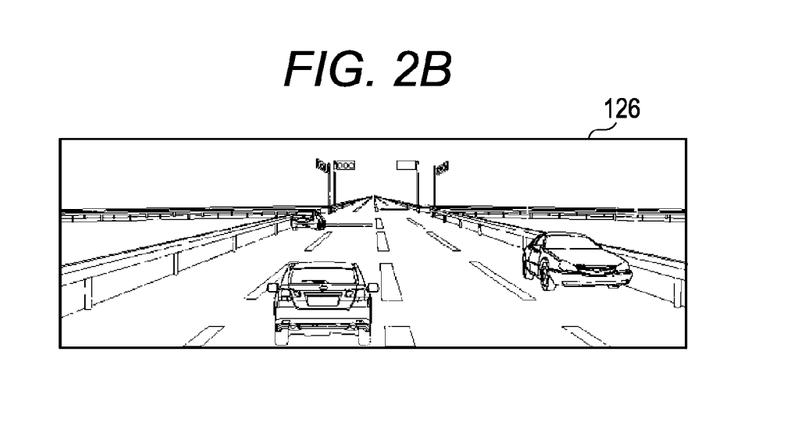

FIG. 2 is an explanatory view for describing a luminance image 124 and a distance image 126. For example, it is supposed that the luminance image (image data) 124 illustrated in FIG. 2A is generated for the detection region 122 by two imaging devices 110. In the present embodiment, for easy understanding, only one of two luminance images 124 is schematically illustrated. The image processing apparatus 120 obtains a parallax for each block from the luminance image 124 so as to form the distance image 126 illustrated in FIG. 2E. Each block in the distance image 126 is associated with the parallax of the corresponding block. In the present embodiment, for the sake of convenience of description, the block from which the parallax is derived is indicated by black dots.

(Environment, Recognition Apparatus 130)

The environment recognition apparatus 130 obtains the luminance image 124 and the distance image 126 from the image processing apparatus 120, and specifies an object (vehicle, traffic light, road, guard rail, tail lamp, turn signal, lighting portions of a traffic light, etc.) to which the object in the detection region 122 corresponds by using the luminance based upon the luminance image 124 and the relative distance from the vehicle (vehicle) 1 based upon the parallax information of the distance image 126. In this case, the environment recognition apparatus 130 converts the parallax information for each block in the detection region 122 in the distance image 126 into three-dimensional position information including the relative distance by use of a so-called stereo method. The stereo method is to derive the relative distance of the object to the imaging device 110 from the parallax of the object by use of a triangulation.

(Vehicle Control Apparatus 140)

The vehicle control apparatus 140 makes a control to avoid a collision to the object specified by the environment recognition apparatus 130, or a control, to keep a safe distance between the vehicle 1 and a vehicle ahead. Specifically, the vehicle control apparatus 140 acquires the current traveling condition of the vehicle 1 through a steering angle sensor 142 that detects a steering angle or a vehicle speed sensor 144 that detects a speed of the vehicle 1, and keeps a safe distance between the vehicle 1 and the vehicle ahead through the control of an actuator 146. The actuator 146 is the one for controlling the vehicle, which is used to control a brake, a throttle valve, or steering angle. When the collision to the object is expected, the vehicle control apparatus 140 displays (announces) an alarm indicating this condition onto a display 148 mounted ahead of a driver, and controls the actuator 146 so as to automatically stop the vehicle 1. The vehicle control apparatus 140 can be integrally configured with the environment recognition apparatus 130.

(Problem and its Solution in First Embodiment)

A color image can be obtained in various forms. For example, (1) light incident on the imaging device 110 is separated into each of RGB color phases by a prism, and an image is obtained by three imaging sensors for each of three color phases; (2) images based upon RGB are obtained at a time by an image sensor having sensitivity cells for the respective RGB superimposed in a direction of an optical path; or (3) one color phase is regularly and exclusively obtained for each pixel according to the Bayer array. In the present embodiment, an image is obtained by employing the Bayer array in the section (3).

Figure 3A:
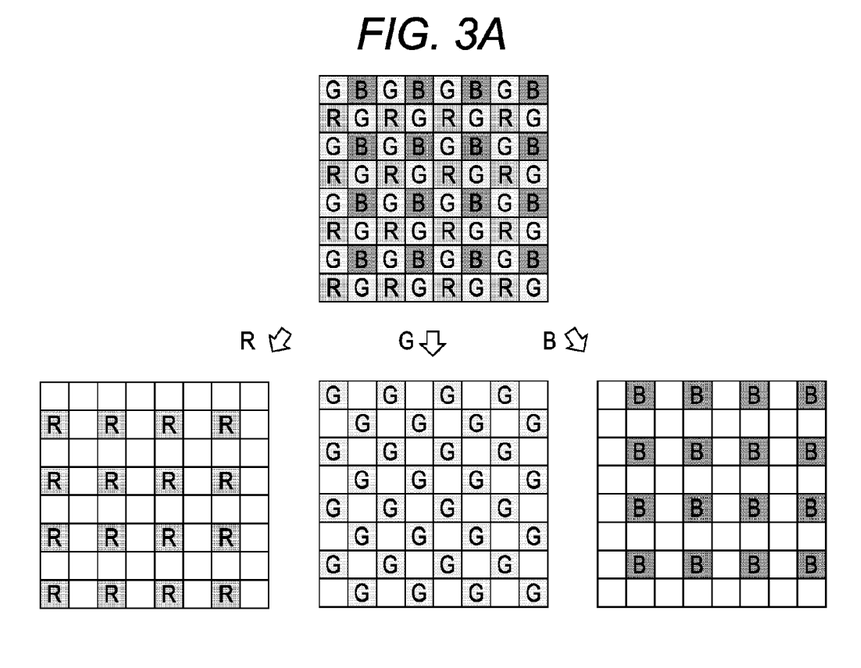
FIG. 3 is an explanatory view for describing one example of Bayer array.
Figure 3B:
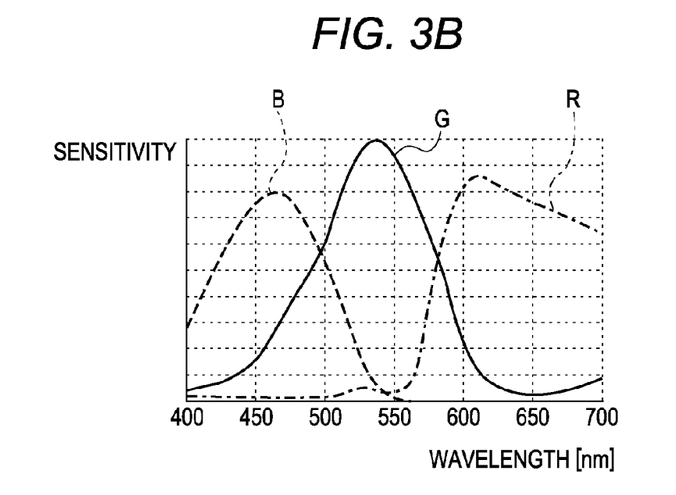

FIG. 3 is an explanatory view for describing one example of the Bayer array. As illustrated in FIG. 3A, in the Bayer array, each of color phases RGB is regularly and exclusively arranged on each of pixels arranged in a matrix. The same color phase is arranged by at least one pixel away in the horizontal direction and in the vertical direction, for all color phases. It is to be noted that the color phase G has density (occupied area) twice as much as the densities of the color phase R and the color phase B. This is based upon the reason described below. Specifically, as illustrated in a spectral sensitivity characteristic in FIG. 3B, the sensitivity distribution of the color phase G is high. Therefore, the luminance information, of the color phase G is easy to be acquired. Further, a human vision has high sensitivity to the color phase G.

In the Bayer array, luminance can be obtained for only one color phase in each pixel. In view of this, a color reproduction process (interpolation process) is executed to two missing color phases by using the luminance of the corresponding color phases of the adjacent pixels.

Figure 4A:
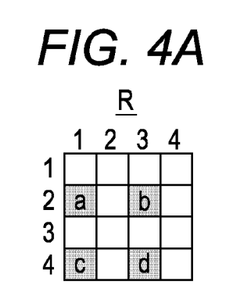
FIG. 4 is an explanatory view for describing a color reproduction process.

FIG. 4 is an explanatory view for describing the color reproduction process. In the present embodiment, numbers put around the image indicate the horizontal position and vertical position of the pixel. For example, the color phase R is arranged as illustrated in FIG. 4A in the Bayer array. Therefore, the obtained luminance values a, b, c, and d can be utilized as unchanged for the Luminance values of the pixels (2, 1), (2, 3), (4, 1), and (4, 3) whose luminance values for the color phase R are obtained.

As for the pixels (2, 2), (3, 1), (3, 3) and (4, 2) to which two pixels whose luminance values are obtained are adjacent in the horizontal direction or in the vertical direction, the luminance value of each pixel is obtained, by executing a linear interpolation to the luminance values of the adjacent two pixels. Specifically, the luminance values of these pixels are such that the luminance value of the pixel (2, 2)=b)/2, the luminance value of the pixel (3, 1)=(a+/2, the luminance value of the pixel (3, 3)=+/2, and the luminance value of the pixel (4, 2)=(c+d)/2.

Figure 4B:
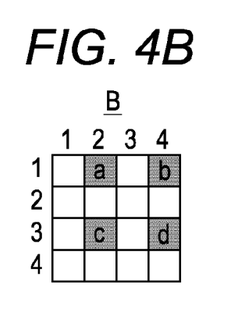

The luminance value of the pixel (3, 2), to which four pixels whose luminance values are obtained are adjacent in the diagonal direction, is obtained by executing a linear interpolation to the luminance values of the adjacent four pixels, whereby the luminance value of the pixel (3, 2) becomes (a+b+c+d)/4. For the sake of convenience of the description, how to derive the luminance values of the pixels on the first line in the horizontal direction and on the fourth line in the vertical direction are not described here. The interpolation of the pixel described above can be applied to the color phase B as illustrated in FIG. 4B, so that the description for the color phase B is skipped here.

Figure 4C:
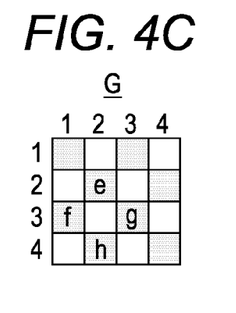

The color phase G is arranged as illustrated in FIG. 4C in the Bayer array. Therefore, the obtained Luminance values e, f, g, and h can be utilized as unchanged for the luminance values of the pixels (2, 2), (3, 1), (3, 3), and (4, 2) whose luminance values for the color phase G are obtained. The luminance value of the pixel (3, 2), to which four pixels whose luminance values are obtained are adjacent in the diagonal direction, is obtained by executing a linear interpolation to the luminance values of the adjacent four pixels, whereby the luminance value of the pixel (3, 2) becomes (e+f+g+h)/4.

It can be understood from the above that, for any one of the color phases, a minimum region of three pixels is needed (the maximum number of the reference pixels is four) in the horizontal direction or in the vertical, direction in order to reproduce an original color. It is supposed that an object that is narrow in one direction, such as an electric wire or tree (leaf), is imaged. If the width of such object is 1 pixel or 2 pixels, a reproduction to a proper color becomes difficult.

For example, it is supposed that an object whose width in the horizontal direction is 1 pixel is located on the second line in the vertical direction in FIG. 4A. There is no information related to the R component of the object on the second line in the vertical direction in FIG. 4A, so that a false color affected by the R component of the other object is generated due to the above-mentioned linear interpolation. Similarly, it is supposed that an object whose width in the horizontal direction is 1 pixel is located on the third line in the vertical direction in FIG. 4B. There is no information related to the B component of the object on the third line in the vertical direction in FIG. 4B, so that a false color affected by the B component of the other object is generated due to the above-mentioned linear interpolation. On the other hand, in FIG. 4C, the information related to the G component of the object is included even on the second line in the vertical direction and on the third line in the vertical direction. Therefore, a color close to the original color can be reproduced, even if there is an influence of the G component of the other object.

Accordingly, when only the color phase G having the high density in the Bayer array is handled in the color reproduction process, a false color is difficult to be generated, whereby the color reproducibility can be enhanced, compared to the case where the color phases F and B are also considered. If the false color is generated, not only the pattern matching cannot properly be executed, but also erroneous parallax information might be derived by mismatching. In the present embodiment, the situation described above can be prevented by enhancing the color reproducibility as described above.

Figure 5A:
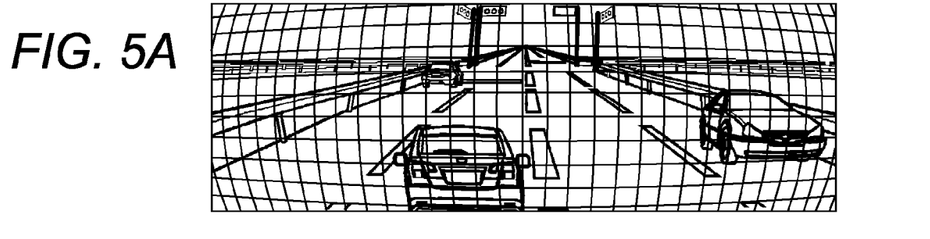
FIG. 5 is an explanatory view for describing a coordinate conversion process.
Figure 5B:
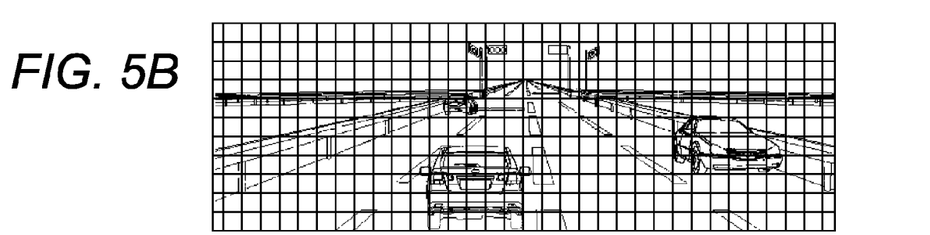

After the color reproduction, process is completed, a coordinate conversion process is executed. In the coordinate conversion process, a coordinate of each pixel is converted based upon a positional deviation (distortion) characteristic, which is determined beforehand according to the imaging device 110, for each pixel. The coordinate conversion is a process of returning the object, which is obtained as being distorted from the original position because it is captured through the imaging device 110, to the original position. For example, an image having a positional deviation characteristic as if it is captured through a fish-eye lens as illustrated in FIG. 5A is corrected to an image illustrated in FIG. 5B in which a horizontal direction and vertical direction are straight, by a simple shift in the horizontal direction or in the vertical direction, or a rotational movement using affine transformation.

In the coordinate conversion described above, the color reproduction of the pixel after the coordinate conversion is executed. However, a problem arises, when a physical centroid of the pixel and a centroid of a color reproduced for this pixel are different from each other. The color centroid can be shifted according to the above-mentioned color reproduction process. The color centroid will be described below.

FIG. 6 is an explanatory view for describing the color centroid. When one pixel indicated by a solid line is reproduced from four pixels (luminance=a, b, c, d) indicated by a broken line in FIG. 6A by a geometric correction, the luminance of the pixel 150 indicated by the solid line is represented by $a \times (1-x)(1-y) + b \times x(1-y) + c \times (1-x)y + d \times xy$ by using distances x and y.

Figure 6A:
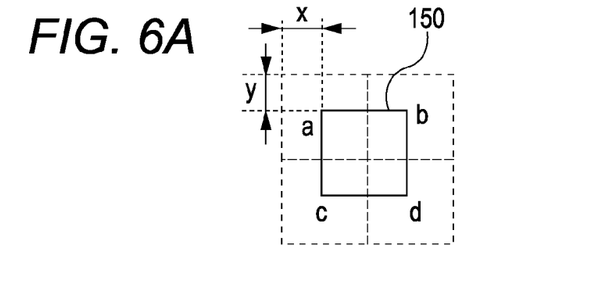
FIG. 6 is an explanatory view for describing a color centroid.
Figure 6B:
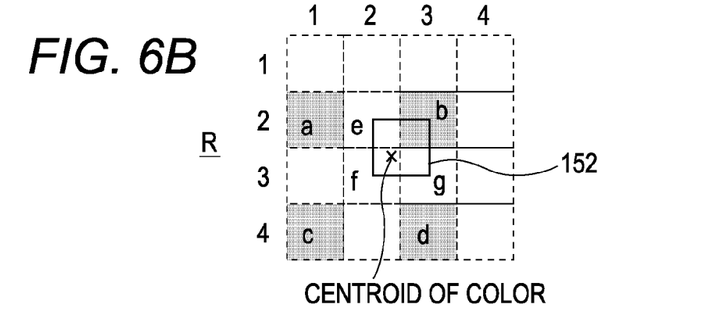
Figure 6C:
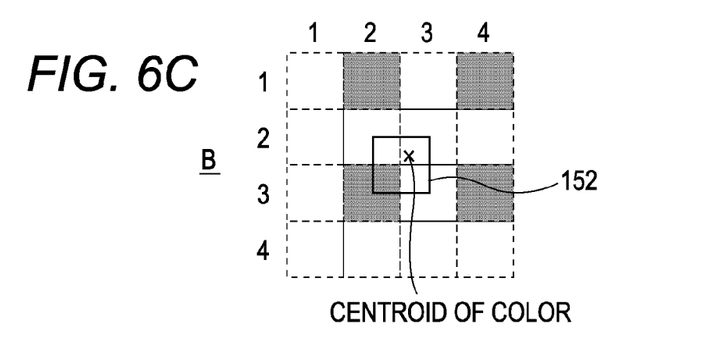

Accordingly, in case where a color phase R is arranged as illustrated in FIG. 6B, and the luminances thereof are a, b, c, and d, the luminance of a pixel 152 indicated by a solid line in FIG. 6B becomes $(b+e+f+g)/4$, when the R components of the pixels (2, 2), (3, 2), and (3, 3) are defined as e, f, and q. For easy understanding, the distances x and y in FIG. 6A are defined as 0.5. According to the above-mentioned color reproduction process, $e=(a+b)/2$, $f=(a+b+c+d)/4$, and $g=(b+d)/2$ are established. In view of this, a degree of contribution of the color phase R to the pixel 152 is $a=3/16$, $b=9/16$, $c=1/16$, and $d=3/16$. In this case, the color centroid is produced at the lower-left part in the figure from the physical centroid (central position) of the pixel 152. When the color phase B undergoes the same process as the color phase R, the color centroid is produced at the upper-right section in the figure from the physical centroid of the pixel 152 as illustrated in FIG. 6C. It is needless to say that the position of the color centroid is changed depending upon how to extract the pixel 152 indicated by the solid line.

Figure 6D:
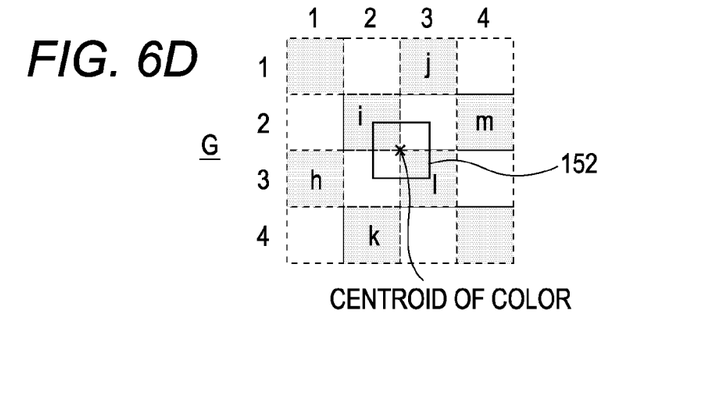

For the color phase G, the degree of contribution of the color phase G to the pixel 152 is $h=1/16$, $i=6/16$, $j=1/16$, $k=1/16$, $l=6/16$, $m=1/16$ as illustrated in FIG. 6D, wherein the luminances of pixels (3, 1), (2, 2), (1, 3), (4, 2), (3, 3), and (2, 4) are defined as h, i, j, k, l, and m. In this case, the color centroid is equal to the physical centroid (central position) of the pixel 152.

When the coordinate conversion is executed, the physical centroid of the pixel and the centroid of the color reproduced for this pixel might be different from each other for the color phases R and B. Therefore, the color centroid might be shifted due to the geometric positional correction based upon the physical centroid of the pixel. However, for example, when only the color phase G, which is equally arranged like a checkered pattern, is handled in the Bayer array, the shift of the color centroid from the physical centroid is not caused, and the color arrangement of the image after the coordinate conversion is proper, compared to the case where the color phases R and B are also considered. If the shift of the color centroid is generated, not only the pattern matching cannot properly be executed, but also erroneous parallax information might be derived by mismatching. In the present embodiment, the situation described above can be prevented by preventing the color shift as described above.

Accordingly, when only the color phase G is handled in the coordinate conversion process, the color reproducibility is enhanced, and the shift can be prevented. The configuration of the image processing apparatus 120 that handles only the color phase G as the target color phase will be described below.

(Image Processing Apparatus 120)

Figure 7:
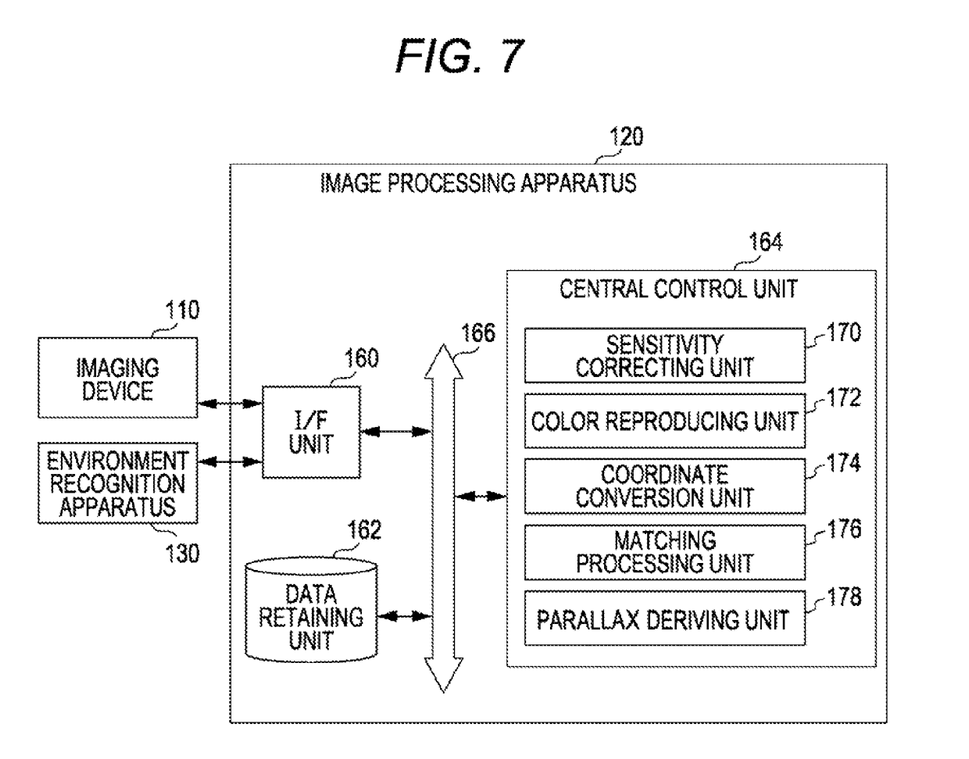
FIG. 7 is a functional block diagram illustrating schematic functions of the image processing apparatus.

FIG. 7 is a functional block diagram illustrating schematic functions of the image processing apparatus 120. As illustrated in FIG. 7, the image processing apparatus 120 includes an I/F unit 160, a data retaining unit 162, and a central control unit 164.

The I/F unit 160 is an interface that performs two-way information exchange between the I/F unit 160 and the imaging device 110 or the environment recognition apparatus 130. The data retaining unit 162 is configured by a RAM, a flash memory, and HDD. It retains various information pieces needed for the processes of the respective functions described below. The data retaining unit 162 also retains the luminance image 124 received from the imaging device 110 temporarily.

The central control unit 16 is composed of a semiconductor integrated circuit including a central processing unit (CPU), a ROM storing a program and the like, and a RAM serving as a work area. The central control unit 164 controls the I/F unit 160, and the data retaining unit 162 through a system bus 166. In the present embodiment, the central control unit 164 also serves as a sensitivity correcting unit 170, a color reproducing unit 172, a coordinate conversion unit 174, a matching processing unit 176, and a parallax deriving unit 178.

The sensitivity correcting unit 170 performs a predetermined process, such as a gamma correction or knee process, to a pair of image data received from the imaging device 110.

The color reproducing unit 172 reproduces a luminance of a color phase unset to each pixel in the pair of image data composed of the Bayer array, by the linear interpolation based upon the adjacent pixels, as described with reference to FIG. 4. In the present embodiment, all of three primary colors are not extracted, but only the color phase G with the highest degree of occupation in the Bayer array is extracted, and the color reproduction process is executed to the pixel whose luminance for the color phase G is not set.

This configuration makes it difficult to cause a false color, and can enhance color reproducibility, compared to the case where the color phases R and B are also considered. Accordingly, this configuration can avoid the situation in which the pattern matching is not properly executed, or the erroneous parallax information is derived due to the mismatching, thereby being capable of enhancing precision in the pattern matching.

The color phase G is used as the color phase having the highest degree of occupation in the present embodiment. However, any color phase can be used, so long as it has the large occupied area in the Bayer array. For example, the used color phase is not limited to the primary color system of RGB. A complementary color having the highest degree of occupation can be used in a complementary color system such as YMgCyGr.

The coordinate conversion unit 174 performs the coordinate conversion of each pixel based upon the positional deviation characteristic of each pixel determined beforehand according to the imaging device 110 that generates a pair of image data, and derives (reproduces a color) the luminance of the pixel after the coordinate conversion, as described with reference to FIG. 5. Various existing techniques, such as the technique disclosed in Japanese Patent No. 3284190, can be employed. Therefore, the detailed description of the coordinate conversion will be skipped. The coordinate conversion unit 174 reproduces a color after the coordinate conversion by using only the color phase G to which the color reproduction process is performed by the color reproducing unit 172.

Since the color phase G is equally arranged in the Bayer array like a checkered pattern, the shift of the color centroid from the physical centroid is not caused, and the color arrangement of the image after the coordinate conversion is proper, compared to the case where the color phases R and B are also considered. Accordingly, this configuration can avoid the situation in which the pattern matching is not properly executed, or the erroneous parallax information is derived due to the mismatching, thereby being capable of enhancing precision in the pattern matching.

The matching processing unit 176 extracts a block with a predetermined size from each of the pair of data whose luminance is reproduced, and whose positional deviation is corrected, and specifies the blocks having the high correlation through the matching. In the present embodiment, the pattern matching is executed to only the color phase G.

It is considered as the pattern matching that luminance values (Y color-difference signal) are compared in a unit of a block indicating a position of an arbitrary image between two image data pieces. For example, considered techniques include a SAD (Sum of Absolute Difference) using a difference between luminance values, an SSD (Sum of Squared intensity Difference) using squared difference, and an NCC (Normalized Cross Correlation) using degree of similarity in a variance value obtained by subtracting an average from the luminance value of each pixel. The image processing apparatus 120 executes the block-basis parallax deriving process described above for all blocks displayed on the detection region (e.g., 600 pixels×200 pixels). Although the block is specified as 4 pixels×4 pixels here, any number of pixels in a block can be set.

In the present embodiment, the matching processing unit 176 executes the pattern matching by using one color phase G. However, the matching processing unit 176 may execute the pattern matching such that the pattern matching using only one color phase and the conventional pattern matching using three primary colors are switched to be used, depending upon a condition. This configuration can effectively perform the pattern matching. The condition in this case is supposed to be a fineness of an edge, assumed image, or DCDX value. For example, in the case where an edge is fine as a whole, the pattern matching is executed by using only the color phase G. On the other hand, when the edge is not sharp, the pattern matching using three primary colors is executed.

The parallax deriving unit 178 obtains image-based parallax between the blocks specified by the matching processing unit 176 on the basis of a pixel, and associates the parallax with the blocks. The parallax is utilized by the next environment recognition apparatus 130 as the parallax information.

The image processing apparatus 120 described above handles only the color phase G as the color phase, thereby being capable of enhancing color reproducibility, and preventing the shift of the color centroid. Accordingly, the image processing apparatus 120 can properly derive the parallax information by enhancing the precision in the pattern matching, thereby being capable of properly executing a control to avoid a collision to an object, or a control to keep a safe distance between the vehicle 1 and a vehicle ahead.

(Second Embodiment)

In the first embodiment, the matching by using one color phase is executed based upon the Bayer array. In the second embodiment, the matching by using one color phase is executed according to the environment at the outside of the vehicle 1, regardless of the Bayer array.

(Problem and its Solution in Second Embodiment)

When the vehicle 1 runs at night, the light that can be received by the environment recognition system 100 from the detection region 122 is poor as a whole. Therefore, the shutter of the imaging device 110 is opened wide to enhance light-receiving sensitivity. In this case, when a self-luminous light source such as a tail lamp, stop lamp, headlight, or turn signal, appears in the detection region 122, luminance might be saturated by the enhanced light-receiving sensitivity.

If the luminance information is saturated as described above, all pixels that are saturated might exhibit the same luminance, which makes it impossible to execute the proper pattern matching. When the shutter is closed in order to avoid this situation, the pattern matching can be executed to the above-mentioned light source, but on the contrary, an object other than the light source cannot be acquired.

An HID (High Intensity Discharge) lamp or halogen lamp is used for a tail lamp, stop lamp, headlight, or turn signal in the vehicle 1. In the second embodiment, the characteristic of such a lamp is focused.

Figure 8A:
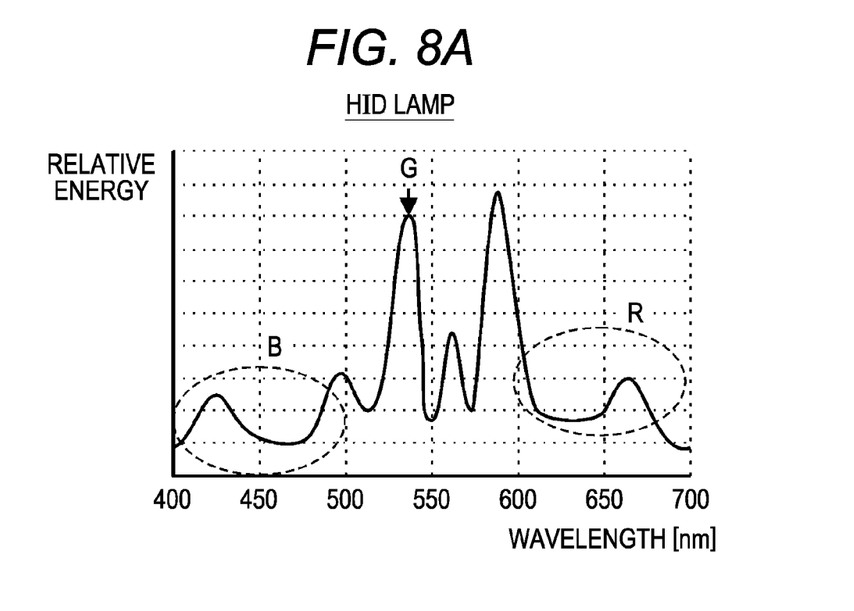
FIG. 8 is an explanatory view for describing an identification of an HID lamp and a halogen lamp.
Figure 8B:
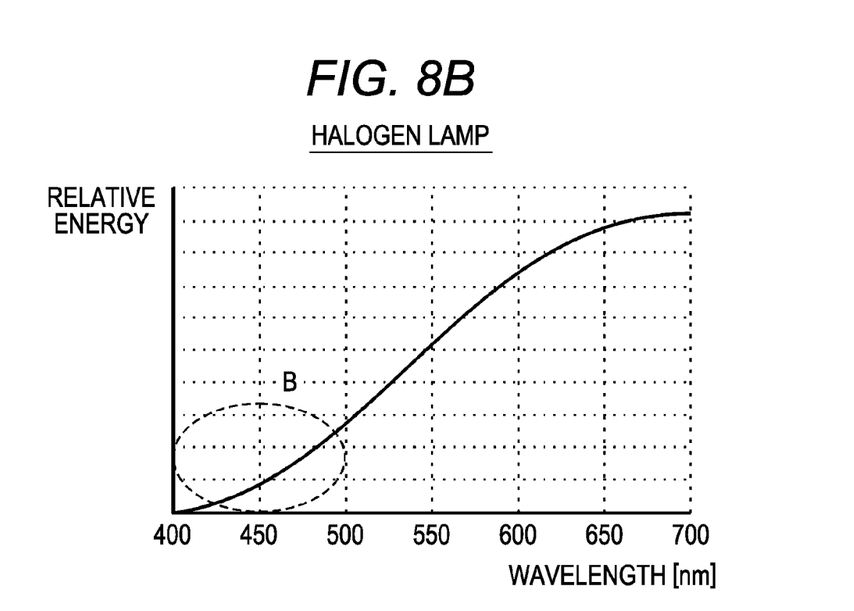

FIG. 8 is an explanatory view for describing an identification of an HID lamp and a halogen lamp. Referring to the spectral energy distribution of an HID lamp (here, a metal halide lamp) illustrated in FIG. 8A, it is found that there is the color phase G, and a wavelength having high relative energy between the color phase G and the color phase R. On the other hand, the relative energy of the color phase B is low. Similarly, in the halogen lamp illustrated in FIG. 8B, the relative energy of the color phase B is low, and the relative energy increases with the increase in the wavelength, i.e., toward the color phase G and color phase R.

In view of this, only the color phase B having weak relative energy is acquired from the light source in order to avoid the saturation in the present embodiment. Since a red or orange filter is formed on the tail lamp, stop lamp, or turn signal, the light of the color phase B is difficult to pass. Therefore, the brightness of the color phase B is more reduced, whereby the saturation is easy to be avoided.

The relative energy of the color phase B is low even if the shutter is opened wide. Therefore, it is difficult to be saturated, resulting in that a value valid, for the luminance can be acquired. With this, a texture by the color phase B is generated, whereby a proper pattern matching can be executed.

(Image Processing Apparatus 220)

Figure 9:
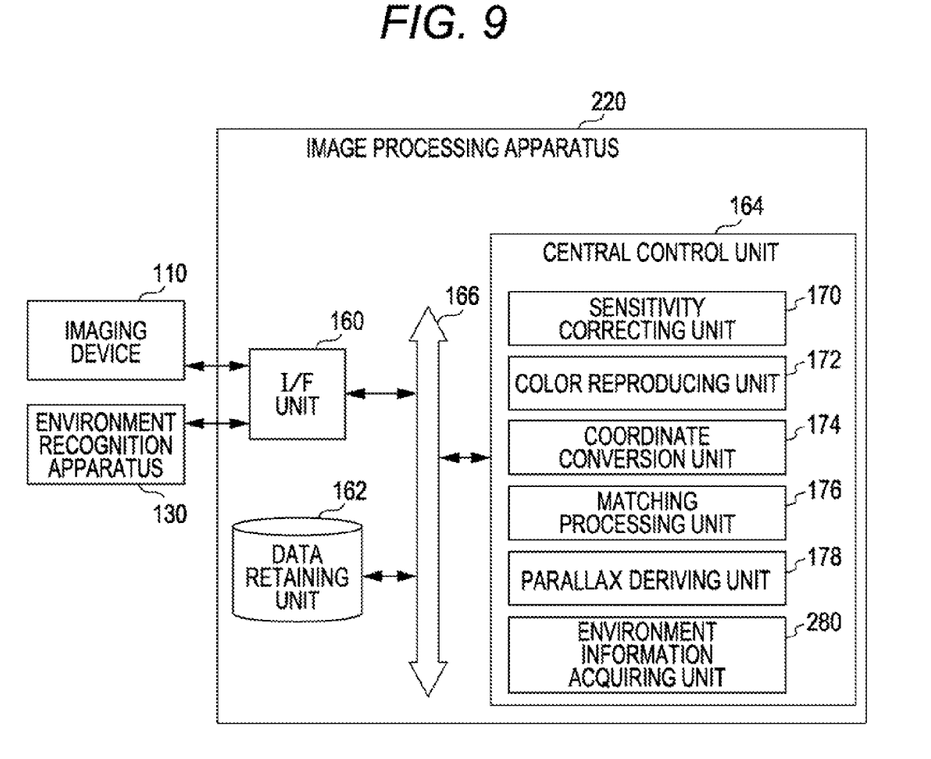
FIG. 9 is a functional block, diagram illustrating schematic functions of an image processing apparatus according to a second embodiment.

FIG. 9 is a functional block, diagram illustrating schematic functions of an image processing apparatus 220 according to the second embodiment. As illustrated in FIG.

9, the image processing apparatus 220 includes an I/F unit 160, a data retaining unit 162, and a central control unit 164, like the image processing apparatus 120 according to the first embodiment. In the present embodiment, the central control unit 164 also serves as a sensitivity correcting unit 170, a color reproducing unit 172, a coordinate conversion unit 174, a matching processing unit 176, a parallax deriving unit 178, and an environment information acquiring unit 280. The I/F unit 160, the data retaining unit 162, the central control unit 164, the sensitivity correcting unit 170, and the parallax deriving unit 178, which have already been described as the components in the first embodiment, have substantially the same function. Therefore, the redundant description of these components will not be repeated. The color reproducing unit 172, the coordinate conversion unit 174, and the matching processing unit 176 are substantially equal to those in the first embodiment, except that the target color phase is the color phase B. Therefore, the redundant description will not be repeated, and the environment information acquiring unit 280 that is different from the first embodiment will mainly be described.

The environment information acquiring unit 280 acquires environment information involved with contrast in the outside environment of the vehicle 1. When the headlight of the vehicle 1 is turned on, for example, the environment information acquiring unit 280 determines that it gets dark to an extent of requiring the headlight, and acquires the lighting of the headlight as "dark" environment information. A lightness sensor may be provided as the environment information acquiring unit 280, wherein the "dark" environment information may be determined by the determination as to whether or not an output of the lightness sensor is not more than an appropriate threshold value.

When the environment information acquiring unit 280 acquires the "dark" environment information indicating the lightness is not more than a predetermined lightness, the matching processing unit 176 executes the matching only for the color phase B that is the color phase having the shortest wavelength from target plural color phases. For example, the wavelength of the color phase R is large, and the wavelength of the color phase B is small in the tail lamp of the vehicle ahead. Therefore, when the matching is performed by using only an image with the wavelength of the color phase B, the matching processing unit 176 can properly execute the pattern matching without the saturation of the tail lamp. Accordingly, the image processing apparatus 220 can properly derive the parallax information, thereby being capable of properly executing a control to avoid a collision to an object, or a control to keep a safe distance between the vehicle 1 and a vehicle ahead.

If the outside environment, has sufficient light as in daytime, i.e., if the environment, information acquiring unit 280 indicates "light" environment information, the matching processing unit 176 executes the pattern matching based upon three primary colors.

As described above, the image processing apparatus 220 can effectively acquire poor incident light by the imaging sensor with the shutter being opened wide during the driving at night, and can properly acquire an object having a light source, thereby being capable of enhancing the precision in the pattern matching.

A program that allows a computer to function as the image processing apparatuses 120 and 220, or a storage medium having the program recorded thereon, such as a computer-readable flexible disk, an magneto-optical disk, a ROM, a CD, a DVD, or a PD, are provided. The program means a data processing function written by any language or according to any writing method.

Although the preferable embodiments of the present invention with reference to the attached drawings have been described above, the present invention is by no means limited to the above-described embodiments. It is obvious that those with ordinary skill in the art will, arrive at various modifications and alternatives within the scope described in the claims, and they are considered to be within the spirit and scope of the present invention.

In the above-mentioned embodiments, the image data simultaneously acquired by using two imaging devices 110 is utilized. However, a pair of image data chronologically obtained by using one imaging device 110 can also be used. The number of the imaging device 110 is not limited to 1 or 2. The present invention is applicable to a compound eye including three or more imaging devices.

In the above-mentioned embodiments, the three primary colors of RGB are described as the Payer array. However, four primary colors of RGBC, or five or more different colors can be employed.

In the above-mentioned embodiments, only the image data obtained through the imaging device 110 is to be used. However, a radiowave laser radar may be used, wherein laser beam corresponding to the specific color phase may be acquired by differing a frequency filter. The radiowave laser radar emits laser beam to the detection region 122, receives light reflected on an object, and analyzes the reflected light. The embodiments of the present invention can be applied to image data for each of temperature measuring sensors of a temperature measuring device.

The present invention is applicable to an image processing apparatus that executes pattern matching based upon a pair of captured image data.

What is claimed is:

1. An image processing apparatus comprising:
a color reproducing unit configured to reproduce a color phase, which is not set to each pixel of a pair of images composed of Bayer array, based upon the adjacent pixels; and
a matching processing unit configured to extract blocks with a predetermined size from the pair of image data whose color phase is reproduced, and execute a matching process to specify blocks having high correlation,
wherein the matching processing unit is configured to select one of first and second processes to execute the matching process on the entire pair of images at one time, depending on fineness of edges in the images,
in the first process, the matching processing unit is configured to execute the matching process with only a color phase with the highest degree of occupation in the Bayer array, and
in the second process, the matching processing unit is configured to execute the matching process with all color phases in the Bayer array.

2. The image processing apparatus according to claim 1, further comprising: a coordinate conversion unit for performing a coordinate conversion of each pixel based upon a positional deviation characteristic of each pixel determined beforehand according to an imaging device that generates the pair of images.

3. The image processing apparatus according to claim 1, wherein the matching processing unit executes the matching process with only the color phase with the highest degree of occupation in the Bayer array when an edge in the images is fine as a whole, whereas the matching processing unit executes the matching process with all the color phases when the edge is not sharp.

4. The image processing apparatus according to claim 1, wherein the pair of images is obtained from a pair of image sensors.

5. An image processing apparatus comprising:
a processor; and
a memory having instructions causing the processor to perform the following steps:
reproducing a color phase, which is not set to each pixel of a pair of images composed of Bayer array, based upon the adjacent pixels; and
extracting blocks with a predetermined size from the pair of images whose color phase is reproduced, and executing a matching process to specify blocks having high correlation, wherein
the processor further is programmed to select one of first and second processes to execute the matching process on the entire pair of images at one time, depending on fineness of edges in the images,
in the first process, the processor is programmed to execute the matching process with only a color phase with the highest degree of occupation in the Bayer array, and
in the second process, the processor is programmed to execute the matching process with all color phases in the Bayer array.

6. The image processing apparatus according to claim 5, wherein the processor further performs a coordinate conversion of each pixel based upon a positional deviation characteristic of each pixel determined beforehand according to an imaging device that generates the pair of images.

7. The image processing apparatus according to claim 5, wherein the processor performs the matching process with only the color phase with the highest degree of occupation in the Bayer array when an edge in the images is fine as a whole, whereas the processor executes the matching process with all the color phases when the edge is not sharp.

8. The image processing apparatus according to claim 5, wherein the pair of images is obtained from a pair of image sensors.

* * * * *